United States Patent [19]

Ueno

[11] 4,338,637
[45] Jul. 6, 1982

[54] VARIABLE SCANNING DEVICE

[75] Inventor: Seizou Ueno, Hino, Japan

[73] Assignee: Tokyo Shibaura Denki Kabushiki Kaisha, Japan

[21] Appl. No.: 199,339

[22] Filed: Oct. 21, 1980

[30] Foreign Application Priority Data

Oct. 25, 1979 [JP] Japan .................. 54-137002

[51] Int. Cl.³ ............................................. H04N 1/40
[52] U.S. Cl. .................................. 358/288; 358/256; 358/280
[58] Field of Search ............. 358/287, 288, 260, 280, 358/261, 137, 256

[56] References Cited

U.S. PATENT DOCUMENTS

| | | | |
|---|---|---|---|
| 3,499,975 | 3/1970 | Arps | 358/288 |
| 3,723,640 | 3/1973 | Perreault | 358/288 |
| 3,876,829 | 4/1975 | Schreiber | 358/285 |
| 3,919,464 | 11/1975 | Kondoh | 358/260 |
| 4,138,693 | 2/1979 | Iizuka | 358/288 |
| 4,237,494 | 12/1980 | Yamaguchi | 358/288 |

FOREIGN PATENT DOCUMENTS 1174611 12/1969 United Kingdom .
1181887 2/1970 United Kingdom .
1370342 10/1974 United Kingdom .

Primary Examiner—Joseph A. Orsino, Jr.
Assistant Examiner—Edward L. Coles
Attorney, Agent, or Firm—Finnegan, Henderson, Farabow, Garrett & Dunner

[57] ABSTRACT

A scanning device is capable of obtaining an image signal of one image line of a manuscript to be transmitted in a variable manner from the scanning output of the m ($2 \leq m$) divided lines at maximum of an image surface. When an image signal output request signal is supplied from a transmission processing unit before the scanning unit completes the read and scan operation of the nth ($1 \leq n \leq m$) divided line, a control unit so controls that a memory unit obtains and transmits an image signal of the one image line from the scanning output signal up to the nth divided line. When the image signal output request signal is supplied before the scanning unit completes the read and scan operation of the (n+1)th divided line, the control unit so controls that the memory unit obtains and transmits an image signal of the one image line from the scanning otuput signal up to the (n+1)th divided line.

4 Claims, 21 Drawing Figures

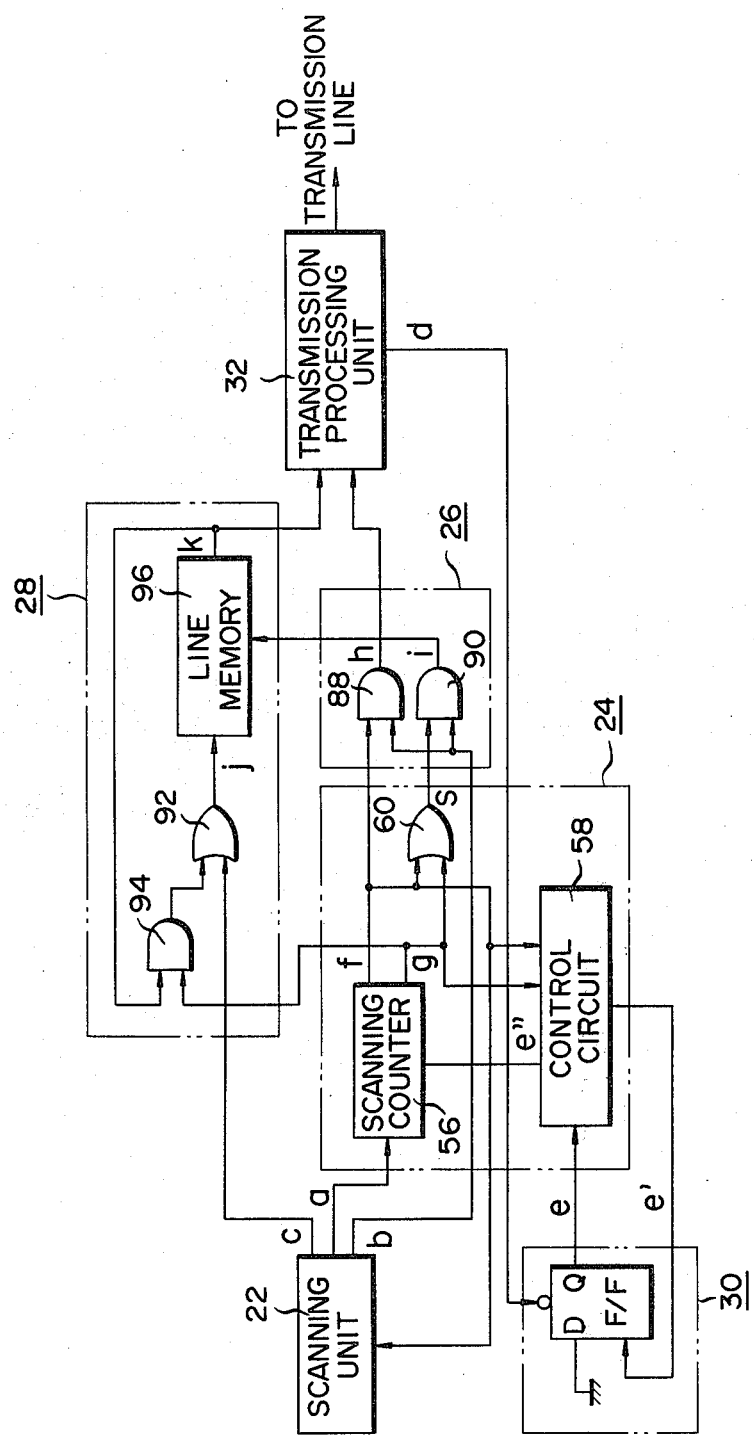
F I G. 1

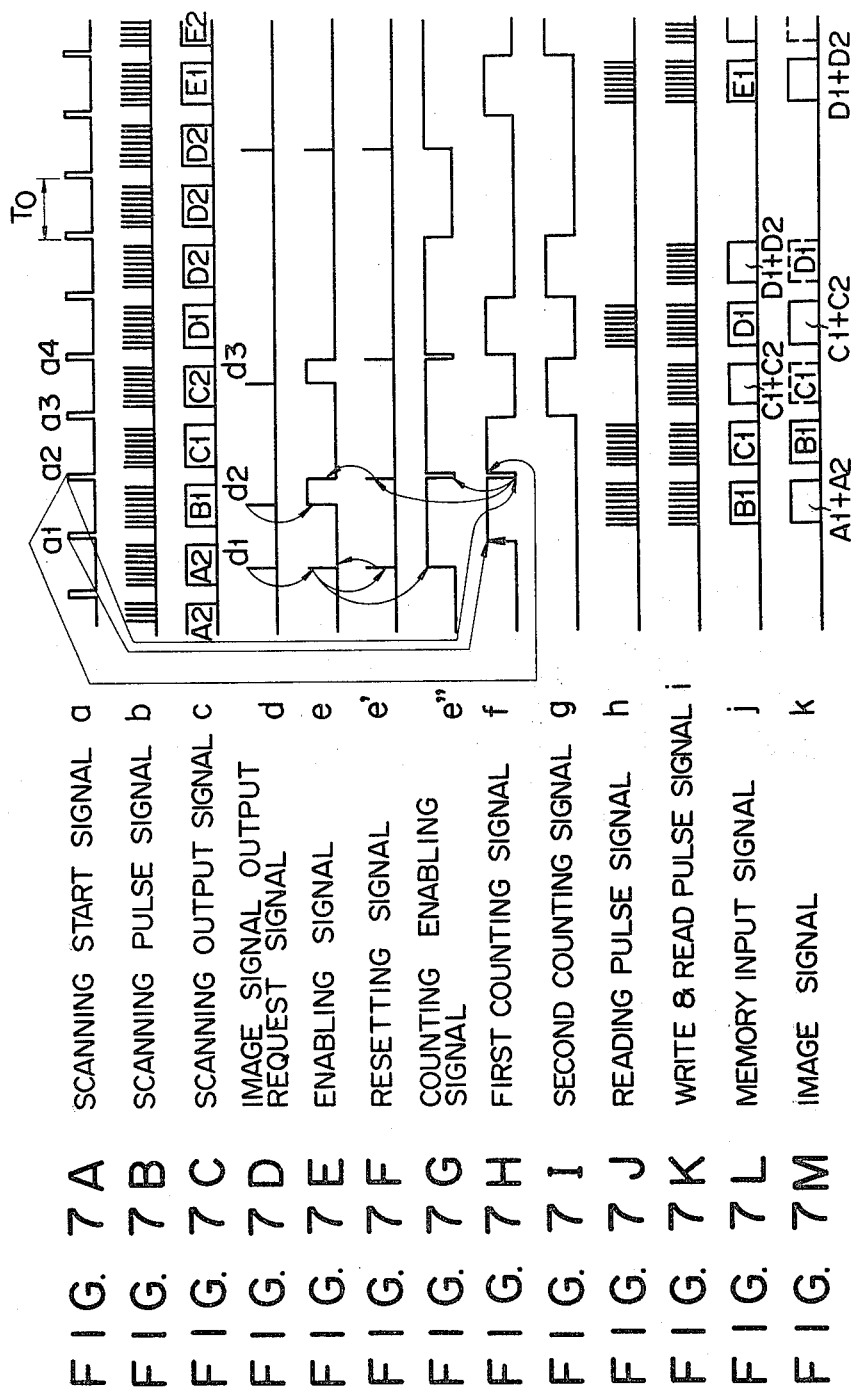

VARIABLE SCANNING DEVICE

The present invention relates to a variable scanning device which is capable of obtaining an image signal of one image line to be transmitted from a reading and scanning output of any number of divided lines.

In facsimiles, image signals which improve reproducibility of image surfaces such as manuscripts are generally obtained with a higher scanning density. However, since this result in an increase in the amount of the image signals to be transmitted, the transmission time becomes disadvantageously long. In order to solve this problem, a conventional device has been proposed which provides an apparent improvement in resolution without elongating the transmission time of the image signals. With this device, an area of the manuscript which is read as one image line to be transmitted is divided into a plurality of divided lines and the image signals are formed for transmission from the scanning output obtained by reading and scanning the plurality of the divided lines. Such technique is disclosed in the Japanese Patent Publication No. 55-15,136.

Such a conventional device is capable of improving the apparent resolution without elongating the transmission time of the image signals.

However, a conventional device of the type described always requires a fixed time for scanning one line of a manuscript. Thus, when the information density on the manuscript is relatively lower, the processing time required for encoding the image signals at the transmission processing unit becomes relatively shorter. However, since the time required for scanning one image line is fixed, the waiting time for the next image signal of the transmission processing unit becomes disadvantageously long.

The present invention has been made to overcome these problems. It is therefore an object of the present invention to provide a variable scanning device which is capable of shortening the waiting time of the transmission processing unit without degrading the resolution.

To the above and other ends, the present invention provides a variable scanning device comprising:

a scanning unit which transfers an image surface by one image line to be transmitted in response to a subscanning signal, scanning m ($2 \leq m$) divided lines at maximum, and provides a scanning output signal, a scanning start signal, and a scanning pulse signal;

a memory unit which stores the image signal of one image line to be transmitted from the scanning output signal supplied from the scanning unit and which supplies it at a predetermined timing;

a transmission processing unit which reads and encodes the image signal supplied from the memory unit at a predetermined timing, and then supplying it to a transmission line, and which supplies an image signal output request signal;

a timing signal generating unit for obtaining timing signals from a scanning pulse signal and gate signals to supply them to the memory unit and the transmission processing unit;

a latch unit which holds the image signal output request signal supplied from the transmission processing unit and provides an enabling signal; and a control unit which is rendered operative in response to the enabling signal supplied from the latch unit, counting the scanning start signals supplied from the scanning unit, then providing gate signals to the timing signal generating unit, and which supplies to the scanning unit a subscanning signal for transferring the image surface by one image line, and which clears the counted value in synchronism with the next scanning start signal when the enabling signal is supplied when it is already in operation and supplies the subscanning signal to the scanning unit. When an image signal output request signal is supplied while the scanning unit is in the scanning process of the nth ($1 \leq n \leq m$) divided line, the memory unit supplies the image signal formed with the scanning output up to the nth divided line. When the image signal output request signal is supplied while the scanning unit is in the process of scanning the (n+1)th divided line, the memory unit supplies the image signal formed with the scanning output up to the (n+1)th divided line after scanning the (n+1)th divided line. Thereafter, the scanning unit proceeds to read and scan the next image line of the image surface in either case.

Thus, since the waiting time of the transmission processing unit of the present invention varies with the density of the image signal to be encoded, the present invention can greatly shorten the waiting time of the transmission processing unit compared with a conventional device where the transmission processing unit has to always wait for a fixed period of time to receive a next image signal. Further, since the image signal output request signals are successively supplied from the transmission processing unit when relatively fine information is not included in the image surface (the manuscript), the apparent resolution will not be degraded.

The other features and advantages of the present invention will become more apparent from the following description when taken in conjunction with the accompanying drawings, wherein:

FIG. 1 is a block diagram illustrating the construction of the device in accordance with one embodiment of the present invention;

FIGS. 7A to 7M are time charts for explaining the overall operation of the device in accordance with the embodiment shown in FIG. 1.

Figure 2:
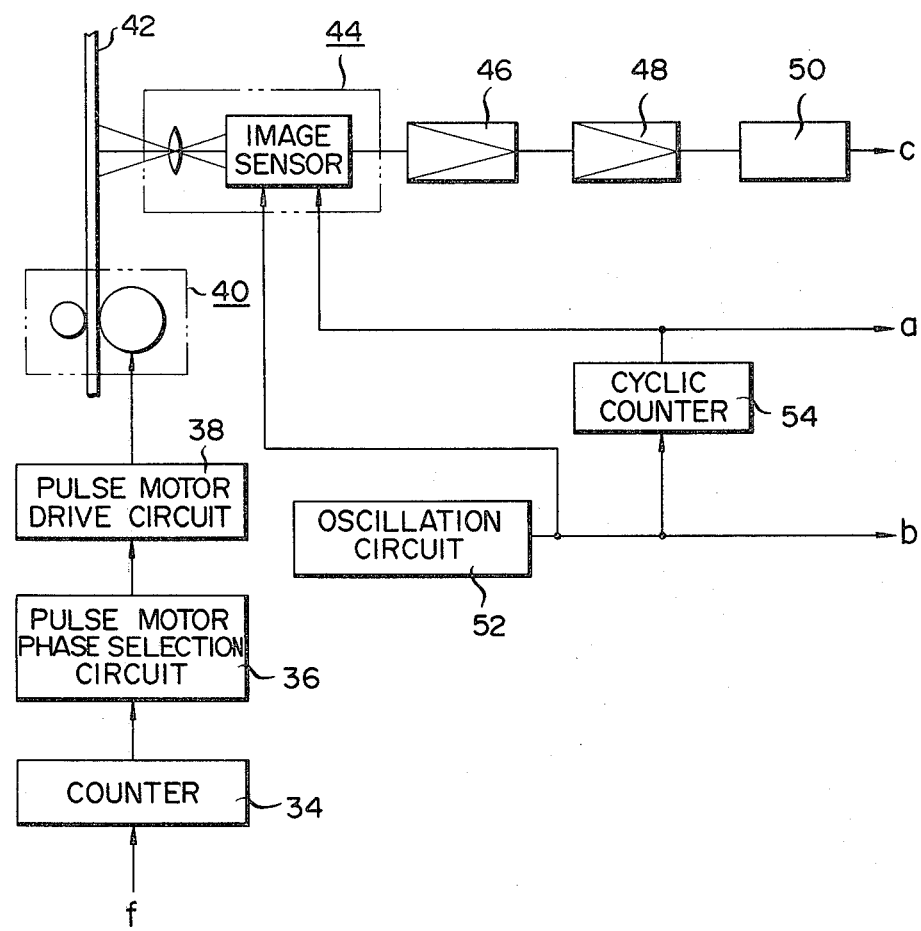
FIG. 2 is a block diagram illustrating the construction of the scanning unit of the device shown in FIG. 1.

FIG. 1 is a block diagram illustrating the construction of one embodiment of the present invention. A scanning unit 22 divides one image line of the image surface to be transmitted into m ($2 \leq m$) divided lines at maximum and then reads and scans the divided lines and supplies a scanning start signal a to a control unit 24, a scanning pulse signal b to a timing signal generating unit 26 and a scanning output signal c to a memory unit 28. The control unit 24 is connected to the scanning unit 22, and is rendered operative in response to an enabling signal e supplied from a latch unit 30 and obtains a first counting signal f and a second counting signal g by counting the scanning start signals a. The control unit 24 further supplies to the timing signal generating unit 26 a gate signal s formed with the logic sum of the first counting signal f and the second counting signal g, and supplies the second counting signal g to the memory unit 28. The control unit 24 also supplies a resetting signal e' to the latch unit 30. The timing signal generating unit 26 is connected to the scanning unit 22, the control unit 24, and supplies to a transmission processing unit 32 a reading pulse signal h obtained from the scanning start signal a and the first counting signal f, and supplies a write and read pulse signal i obtained from the gate signal s and the scanning start signal a to the memory unit 28. The memory unit 28 is connected to the scaning unit 22, the control unit 24, and the timing signal generating unit 26, and stores the scanning output signal as the image signal of one image line to be transmitted in response to the write and read pulse signal i and supplies the already stored image signal k to the transmission processing unit 32. The transmission processing unit 32 is connected to the timing signal generating unit 26, the memory unit 28, and obtains and encodes the image signal k of one image line to be transmitted in response to a reading pulse signal h, supplying it to a transmission line and also supplies an image signal output request signal to the latch unit 30. The latch unit 30 is connected to the control unit 24 and the transmission processing unit 32, renders the enabling signal e "1", and is reset by the resetting signal e'.

FIG. 2 is a block diagram illustrating the construction of the scanning unit 22 of the device shown in FIG. 1. When the first counting signal f outputted from the control unit 24 is input to a counter 34, the counter 34 detects the leading edge of the signal f and supplies the subscanning control pulse signal to a pulse motor phase selection circuit 36. When the subscanning control pule signal is input to the phase selection circuit 36, it supplies a phase signal to a pulse motor drive circuit 38. The drive circuit 38 drives a motor unit 40 in response to the input phase signal. The motor unit 40 transfers an image surface (a manuscript) 42 by one image line to be transmitted when driven by the drive circuit 38. The manuscript 42 is read and scanned by an image sensor 44 with each line divided into m (2≦m) divided lines at maximum and converted into electric signals which are supplied to an amplifier 46. The electric signals amplified at the amplifier 46 are gain adjusted by an automatic gain control circuit 48 and are supplied to an image signal binary coding circuit 50. The gain adjusted electric signals are transformed into binary numbers by the binary coding circuit 50 to provide a scanning output signal c to be supplied to the memory unit 28. The image sensor unit 44 reads and scans in synchronism with a scanning pulse signal b supplied from an oscillation circuit 52 and a scanning start signal a which a cyclic counter 54 obtains by counting the scanning pulse signal b.

Figure 3:
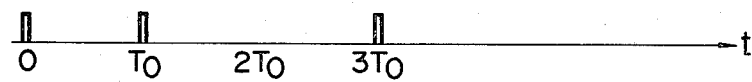
FIG. 3 is a waveform chart of a subscanning control pulse signal outputted upon detecting the leading edge of the first counting signal by the scanning unit shown in FIG. 1.
Figure 3A:
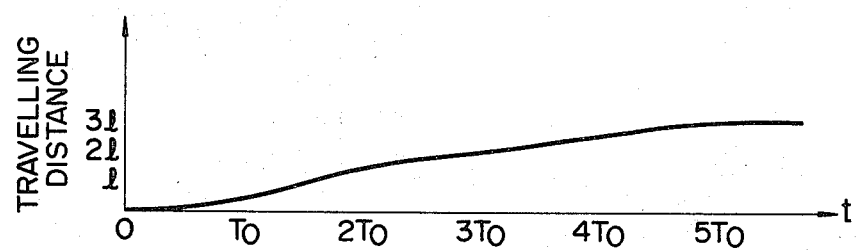
FIG. 3A is a schematic view illustrating the manner the manuscript is transferred by the subscanning control pulse signal shown in FIG. 3.
Figure 3B:
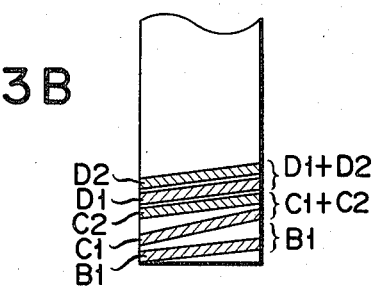
FIG. 3B is a view illustrating the areas of the manuscript read by subscanning shown in FIG. 3A and main scanning of the frequency T0.

FIGS. 3, 3A and 3B are views for explaining subscanning at the scanning unit 22. FIG. 3 shows the subscanning control pulse signal outputted by the counter 34 of the scanning unit 22 upon detecting the leading edge of the first counting signal f. FIG. 3A schematically shows the manner the manuscript is transferred in response to the subscanning control pulse signal. The subscanning system transfers the manuscript by 1 (the width of one image line to be transmitted) in 2T0 when one control pulse is obtained. Thus, as shown in FIGS. 3 and 3A, the manuscript begins to be transferred by this control pulse and is transferred ½ 1 after T0. When a second control pulse is supplied at the time T0, the transfer speed is accelerated and the manuscript is transferred by one image line 1 during the time T0-2T0, i.e., T0. During the time 2T0-3T0, the transfer is effected by the second control pulse alone so that the manuscript is transferred by ½ l. When a third control pulse is supplied at the time 3T0, the manuscript is transferred by 1 in 2T0. The scanning stops at this position until a next control pulse is supplied.

The main scanning is effected at the frequency T0 with respect to the subscanning described above. FIG. 3B shows the areas of the manuscript (hatched portions) read by this scanning operation. An area B1 is read during the first T0, an area C1 is read during the next T0 (T0-2T0), and an area C2 is read in the subsequent T0 (2T0-3T0), and so on.

A scanning counter 56 of the control unit 24 is connected to the scanning unit 22 and is rendered operative in response to a counting enabling signal e" supplied from a control circuit 58. The scanning counter 56 supplies, by counting the scanning start signals, the first counting signal f to the scanning unit 22, the timing signal generating unit 26, the control circuit 58 and an OR gate circuit 60; and the second counting signal g to the timing signal generating unit 26, the memory unit 28 and the control circuit 58. Two input terminals of the OR gate circuit 60 are connected to the scanning counter 56 and obtains the logic sum of the first counting signal f and the second counting signal g to provide a gate signal s and supplies it to the timing signal generating unit 26. The control circuit 58 is connected to the latch unit 30 and the scanning counter 56 and is rendered operative by an enabling signal e, supplying a count enabling signal e" to the scanning counter 56, and supplies a resetting signal e' to the latch unit 30.

Figure 4:
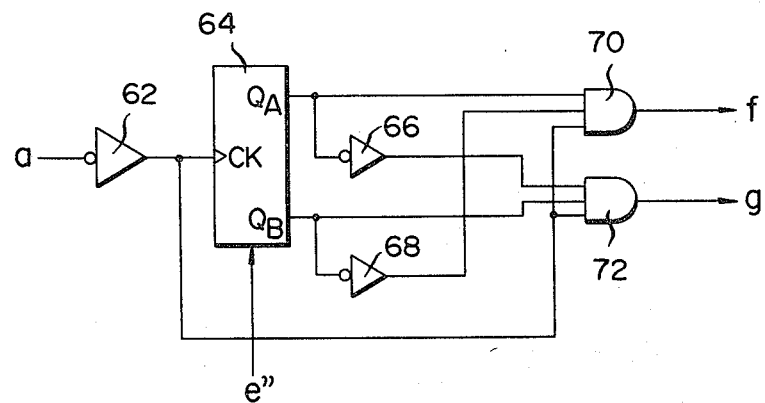
FIG. 4 is a circuit diagram illustrating the construction of the scanning counter shown in FIG. 1.

FIG. 4 is a circuit diagram illustrating the construction of the scanning counter 56. A first inverter 62 inverts the scanning start signal a. The counter 64 is connected to the first inverter 62 and is rendered operative by a count enabling signal e", and by counting the signals supplied from the first inverter 62, supplies the output signal to a second and third inverters 66 and 68 and to a first and second AND gate circuits 70 and 72. The input terminal of the second inverter 66 is connected to the output terminal QA of the counter 64 for inverting the QA output signal. The input terminal of the third inverter 68 is connected to the output terminal QB of the counter 64 for inverting the QB output signal. To three input terminals of the first AND gate circuit 70 are connected the output terminal QA of the counter 64, the output terminal of the first inverter 62 and the output terminal of the third inverter 68 for supplying the first counting signal f. To three input terminals of the second AND gate circuit 72 are connected the output terminal QB of the counter 64, the output terminal of the first inverter 62 and the output terminal of the second inverter 66 for supplying the second counting signal g.

Figure 5:
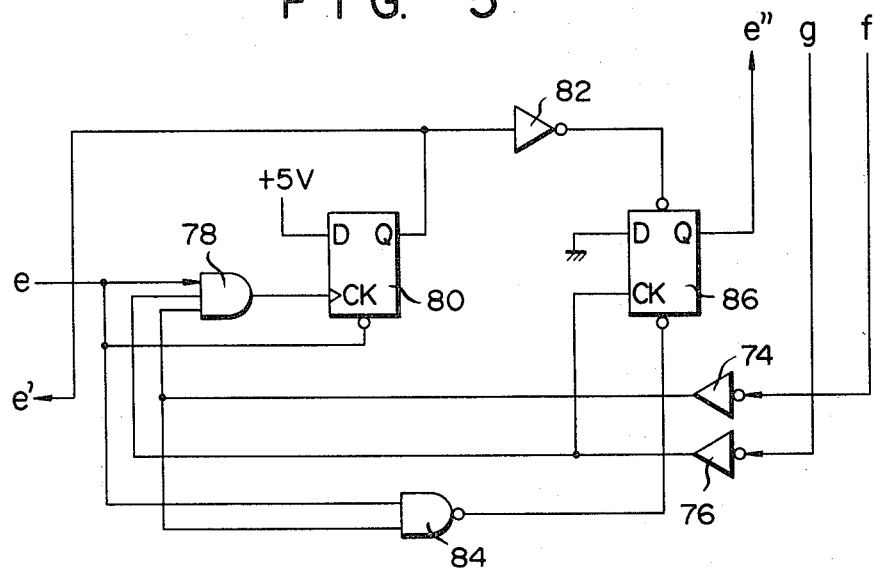
FIG. 5 is a circuit diagram illustrating the construction of the control circuit shown in FIG. 1.

FIG. 5 is a circuit diagram illustrating the construction of the control circuit 58. The input terminal of a fourth inverter 74 is connected to the output terminal of the first AND gate circuit 70 for inverting the first counting signal f. The input terminal of a fifth inverter 74 is connected to the output terminal of the second AND gate circuit 72 for inverting the second counting signal g. Three input terminals of a third AND gate circuit 78 are connected to the output terminals of the latch unit 30, and fourth and fifth inverters 74 and 76 for obtaining the logic sum of these three input signals to supply a clock pulse signal to a first D type flip-flop 80. The clock pulse input terminal of the first D type flip-flop 80 is connected to the output terminal of the third AND gate circuit 78 for supplying a resetting signal e' of "1" when an enabling signal e of "1" is input. The input terminal of a sixth inverter 82 is connected to the output terminal Q of the first D type flip-flop 80 for inverting the resetting signal e'. Two input terminals of a NAND gate circuit 84 is connected to the output terminal of the fourth inverter 74 and the latch unit 30 for supplying a resetting signal to a second D type flip-flop 86. The setting terminal of the second D type flip-flop 86 is connected to the output terminal of the sixth inverter 82, its resetting terminal is connected to the output terminal of the NAND gate circuit 84, and its clock pulse terminal is connected to the output terminal of the fifth inverter 76 for supplying a count enabling signal e" to the scanning counter 56.

The control circuit 58 of the construction described above operates in the following manner. If an enabling signal e of "1" is supplied from the latch unit 30, when the count enabling signal e" supplied from the control unit 58 is "1", the control circuit 58 changes the level of the signal e" to "1" and supplies the impulse resetting signal e'. If the enabling signal e becomes "1" when either of the first counting signal f and the second counting signal g is "1" (the count enabling signal e" will be "1" at such time), the control circuit 58 changes the signal e" level to "0" for a short time and thereafter "1" at the moment the level of the signal f or the signal g drops "0" and supplies the resetting signal e'. The above-mentioned short time is shorter than the time of the pulse width of the scanning start signal a but is sufficient to operate the scanning counter 56. When the second counting signal g drops from "1" to "0" with the enabling signal e being "0", the counted value of the scanning counter 56 is cleared by rendering the count enabling signal e" "0", and then the counting operation is interrupted.

This control unit conveniently comprises a microcomputer.

The timing signal generating unit 26 comprises a fourth AND gate circuit 88, the two input terminals of which are connected to the scanning unit 22 and the control unit, for obtaining a read signal from the logic sum of the first counting signal f and the scanning pulse signal b to supply it to the transmission processing unit 32, and a fifth AND gate circuit 90, the two input terminals of which are connected to the scanning unit 22 and the control unit 24, for obtaining a write and read signal from the logic sum of the gate signal s and the scanning pulse signal b to supply it to the memory unit 28.

One of the two input terminals of an OR gate circuit 92 of the line memory unit 28 is connected to the scanning unit 22 and the other is connected to the output terminal of a sixth AND gate circuit 94 for obtaining a memory input signal j from the logic sum of the scanning output signal c and the image signal k stored in a line memory 96 to supply it to the line memory 96. Two input terminals of the sixth AND gate circuit 94 are connected to the control unit 24 and the output terminal of the line memory 96 for opening the gate to supply the image signal to the OR gate circuit 92. The line memory 96 consists of shift registers and is connected to the output terminal of the OR gate circuit 92, the timing signal generating unit 26, and the transmission processing unit 32, and inputs the memory input signal j in response to a write and read pulse signal i and supplies the image signal k of one image line to be transmitted to the transmission processing unit 32.

Figure 6:
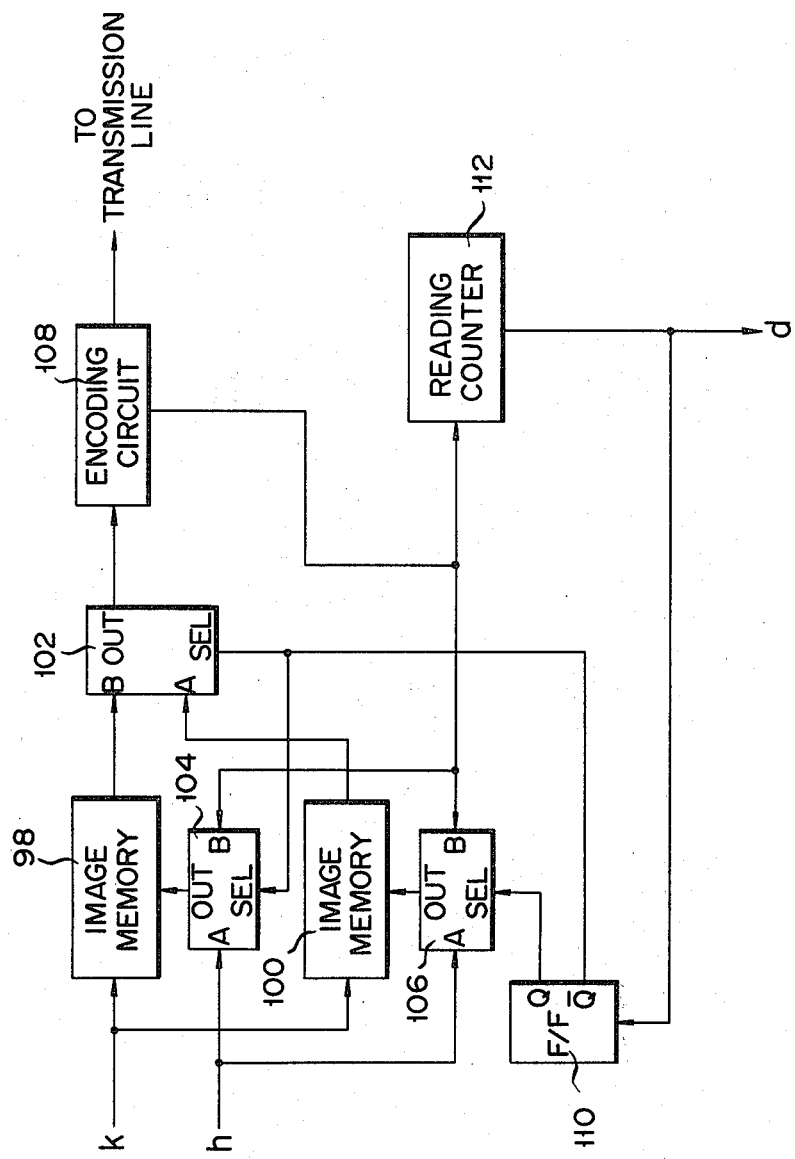
FIG. 6 is a block diagram illustrating the construction of the transmission processing unit shown in FIG. 1.

FIG. 6 is a block diagram illustrating the construction of the transmission processing unit 32. The input terminals of first and second image memories 98 and 100 are connected to the memory unit 28 and stores the image signals k. The input terminals of the first selector 102 are connected to the output terminals of the first and second image memories 98 and 100 and the first selector 102 supplies the image signals supplied from the first and second image memories 98 and 100 to an encoding circuit 108. The input terminals A of second and third selectors 104 and 106 are connected to the timing signal generating unit 26, their input terminals B are connected to the reading signal output terminal of the encoding circuit 108 and the selectors 104 and 106 supply a write and read signal to the first and second image signal memories 98 and 100.

The input terminal of the encoding circuit 108 is connected to the output terminal of the first selector 102, and encodes the input image signals to supply them to the transmission line (not shown) and supplies a read signal. The resetting terminal of the flip-flop 110 is connected to the output terminal of a reading counter 112 for supplying a selection signal to the first, second and third selectors 102, 104 and 106. The input terminal of the reading counter 112 is connected to the read signal output terminal of the encoding circuit 108 for supplying the image signal output request signal d.

The mode of operation of the device of this embodiment of the construction shown above will now be described with reference to the time charts shown in FIGS. 7A to 7M. The following assumption is first made: the image signal output request signal d1 shown in FIG. 7D is supplied from the transmission processing unit 32 to the latch unit 30; when the enabling signal e (FIG. 7E) outputted from the latch unit 30 becomes "1", the scanning with the scanning unit 22 has been completed to the second divided line and the scanning output A2 for the second divided line shown in FIG. 7C is supplied even though it is not necessary. In this case, since the scanning up to the second divided line has been completed, the count enabling signal e" (FIG. 7G) is "0". Thus, by the enabling signal e of "1" outputted from the latch unit 30, the control circuit 58 immediately renders the count enabling signal e" "1" and supplies the resetting signal e' (FIG. 7F) of "1". When the count enabling signal e" becomes "1", the scanning counter 56 is rendered operative. When the scanning start signal a1 is supplied from the scanning unit 22, the scanning counter 56 counts this and outputs the first counting signal f (FIG. 7H) of "1". The scanning unit 22, upon detecting the leading edge of the signal f, transfers the manuscript 42 and performs the scanning of the first divided line of the next image line of the manuscript 42. When the first counting signal f becomes "1", the AND gate circuits 88 and 90 open and output the read pulse signal h (FIG. 7J) and the write and read pulse signal i (FIG. 7K) in synchronism with the scanning pulse signal b outputted from the scanning unit 22, respectively. In response to the write and read pulse signal i, the line memory 96 performs the write and read operation. Then the scanning output B1 of the first divided line of the new image line is stored in the line memory 96 as the memory input signal j (FIG. 7L) through the OR gate circuit 92. At the same time, the image signal A1+A2 of the preceding line already stored in the line memory 96 is read out and is supplied as an image signal k (FIG. 7M) to the transmission processing unit 32.

When the image signal output request signal d2 is supplied to the latch unit 30 during this write and read operation, the enabling signal e of "1" is supplied from the latch unit 30. This enabling signal e remains during the time the first counting signal f supplied from the scanning counter 56 is "1". When the scanning start signal a2 is supplied from the scanning unit 22, the signal f drops to "0". When this signal f becomes "0", the control circuit 58 drops the enabling signal e'' to "0" for a short time as described before and supplies the resetting signal e'. When the enabling signal is dropped to "0" for a short time, the scanning counter 56 is cleared. When the count enabling signal e'' is rendered "1" again, the scanning start signal a of "1" is still outputted as a counting input of the scanning counter 56 so that the first counting signal f becomes "1" again. The scanning unit 22 detects the leading edge of the signal f and transfers the manuscript and performs the read and scan operation of the first divided line of the new image line of the manuscript 42. Thus, as has been described, the first scanning output C1 of the new line is written in the line memory 96 and the scanning output B1 of the immediately preceding line already stored therein is read out. That is, since the image signal output request signal d2 is supplied from the transmission processing unit 32 during the read and scan operation of the first divided line of the preceding line, the scanning output B1 of the first divided line is supplied to the transmission processing unit 32 as the output image signal k for one image line of the manuscript.

When the scanning start signal a3 is outputted from the scanning unit 22 after completion of the writing of the scanning output C1, the scanning counter 56 counts this, and renders the first counting signal f "0" and the second counting signal g "1". Thus, the AND gate circuit 90 is kept open, and the write pulse signals i are continuously outputted. On the other hand, the AND gate circuit 88 is closed and the read pulse signal h stops. At this time, the scanning unit 22 has begun the read and scan operation of the second divided line. When the image signal output request signal d is not outputted from the transmission processing unit 32 before the completion of the read and scan operation of the first divided line (before the scanning start signal a3 is outputted in the case of this embodiment), the scanning unit 22 performs the read and scan operation of the second divided line. The operation of the line memory 96 in this case is performed in the following manner. Since the AND gate circuit 94 is opened by the second counting signal g, the OR gate circuit 92 obtains the logic sum for every bit of the scanning output C2 of the second divided line and the corresponding bit of the scanning output C1 of the first divided line read out from the line memory 96. The logic sum output C1+C2 from the OR gate circuit 92 is supplied and stored in the line memory 96. The output C1 read out as the image signal k from the line memory 96 is not supplied to the transmission processing unit 32 since the read pulse signal h is not supplied from the AND gate 88.

When the image signal output request signal d3 is outputted from the transmission processing unit 32 during the writing operation into the line memory 96, the setting signal e of the latch unit 30 becomes "1". The setting signal e of "1" remains while the second counting signal g is "1". When the next scanning start signal a4 is supplied from the scanning unit 22, the scanning counter 56 drops the signal g to "0". At this time, as has been described, the control circuit 58 drops the enabling signal e'' to "0" for a short time and supplies the resetting signal e'. The further operation is the same as in the case when the image signal output request signal d2 is outputted from the transmission processing unit 32. In this case, since the image signal output request signal d3 has been outputted from the transmission processing unit 32 during the read and scan operation of the second divided line of the preceding line, the logic sum C1+C2 is supplied to the transmission processing unit 32 from the line memory 36 at the output image signal k for one image line of the manuscript.

The manuscript 42 is sequentially converted into the image signals and transmitted in the similar manner. That is, when the image signal output request signal is supplied before the completion of the read and scan operation of the first divided line, the scanning output of the first divided line is outputted as the image signal for one image line of the manuscript to be transmitted after completing the scanning of the first divided line. When the image signal output request is outputted before the completion of the read and scan operation of the second divided line, the image signal formed from the scanning outputs of the first and second divided lines is supplied after completing the scanning of the second divided line.

The read and scan output signals after B1 shown in FIG. 7C correspond to the hatched parts shown in FIG. 3B. Thus, as shown in FIG. 7M, for B1, the scanning output signal of the first divided line is outputted as the image signal of one image line to be transmitted. As for the C1, C2, and D1, D2, the sums C1+C2 and D1+D2 of the scanning output signals of the two divided lines are outputted as the image signal for one image line to be transmitted.

The present invention is not limited to the particular construction shown in the device of the above embodiment. Although the manuscript is transferred by the two divided lines upon detection of the leading edge of the first counting signal f (a control pulse), the manuscript may be transferred by one divided line with one control pulse, which may be generated upon detection of the leading edge of either of the first counting signal f and the second counting signal g. Further, although one control signal is generated by the leading edge of the first counting signal f for subscanning in the above embodiment, a control pulse may be generated by the trailing edge of the first counting signal f for similar subscanning operation.

Further, although the logic sum of the scanning outputs for each divided line is obtained for providing the image signal of one image line to be transmitted from the scanning output signals of two divided lines at maximum, it is, of course, possible to divide one line of the image surface into divided lines of more than 2 in number. Instead of the logic sum, the logic product or a combination thereof may alternatively be used. Although the shift registers are used in the above embodiment, other memory devices such as RAMs may be used. In the above embodiment, it is also possible to adopt one microcomputer as the control unit, the memory unit, the transmission processing unit, the latch unit, and the timing signal generating unit. It is to be understood that various other modifications may be made without departing from the spirit and scope of the present invention.

What is claimed is:

1. A variable scanning device comprising:
a scanning unit which divides one image line of an image surface to be transmitted into m ($2 \leq m$) divided lines at maximum, scanning the divided lines and supplies a scanning pulse signal controlling the scanning, a scanning start signal indicating the start of scanning obtained in synchronism with said scanning pulse signal, and a scanning output signal obtained in synchronism with said scanning pulse signal, said scanning unit transmitting said image surface by one image line to be transmitted by inputting a subscanning signal;
a memory unit connected to said scanning unit, which obtains an image signal from said scanning output signal supplied from said scanning unit for storing it in response to a write and read pulse signal and which transmits said image signal of one image line to be transmitted already stored therein;
a transmission processing unit connected to said memory unit, which reads and encodes said image signal supplied from said memory unit for supplying it to a transmission line and which supplies an image signal output request signal;
a latch unit connected to said transmission processing unit, to which is input said image signal output request signal supplied from said transmission processing unit for supplying an enabling signal;
a control unit connected to said latch unit and said scanning unit, which is rendered operative by said enabling signal supplied from said latch unit for counting scanning start signals supplied from said scanning unit, said control unit supplying a gate signal for obtaining and supplying at said memory unit said image signal from said scanning output signal of up to the nth ($1 \leq n \leq m$) divided line when another enabling signal is supplied from said latch unit while counting said scanning start signal corresponding to said nth divided line from said scanning unit, said control unit supplying a gate signal for obtaining and supplying at said memory unit said image signal from said scanning output signal up to the (n+1)th divided line when another enabling signal is supplied from said latch unit while counting said scanning start signal corresponding to said (n+1)th divided line from said scanning unit, said control unit also supplying subscanning signal; and
a timing signal generating unit connected to said control unit, said scanning unit, said memory unit, and said transmission processing unit, which obtains a read pulse signal and a write and read signal from said scanning pulse signal supplied from said scanning unit and said gate signal supplied from said control unit for supplying said read pulse signal to said transmission processing unit and said write and read pulse signal to said memory unit.

2. A variable scanning device as recited in claim 1, wherein said control unit comprises a scanning counter connected to said scanning unit for counting said scanning start signals from said scanning unit to supply counting signals; an OR gate circuit connected to said scanning counter for obtaining a logic sum of said counting signals from said scanning counter to supply a gate signal; and a control circuit connected to said scanning counter and said latch unit for obtaining and supplying a count enabling signal and a resetting signal from said enabling signal from said latch unit and said counting signals from said scanning counter.

3. A variable scanning device as recited in claim 2, wherein said scanning counter comprises a first inverter whose input terminal is connected to said scanning unit for inverting said scanning start signal from said scanning unit; a counter whose clock pulse terminal is connected to said first inverter, and whose count enabling terminal is connected to said control circuit for counting output signals from said first inverter and supplying a counting signal when said counting enabling signal is supplied from said control circuit; a second inverter whose input terminal is connected to an output terminal QA of said counter for inverting an output of said terminal QA; a third inverter whose input terminal is connected to an output QB of said counter for inverting an output of said terminal QB; a first AND gate circuit whose three input terminals are connected to the output terminal of said first inverter, the output terminal of said third inverter and said output terminal QA of said counter for obtaining a logic sum of signals supplied from said first inverter, said third inverter and said counter and for supplying a first counting signal; and a second AND gate circuit whose three input terminals are connected to said output terminal of said first inverter, the output terminal of said second inverter and the output QB of said counter for obtaining a logic sum of signals supplied from said first inverter, said second inverter and said counter and for supplying a second counting signal.

4. A variable scanning device as recited in claim 2, wherein said control circuit comprises a fourth inverter whose input terminal is connected to the output terminal of said first AND gate circuit for inverting said first counting signal supplied from said first AND gate circuit; a fifth inverter whose input terminal is connected to the output terminal of said second AND gate circuit for inverting said second counting signal supplied from said second AND gate circuit; a third AND gate circuit whose three input terminals are connected to the output terminals of said fourth and fifth inverters and to said latch unit for obtaining a logic sum of the inverted signals of said first and second counting signals and said enabling signal to supply a signal; a first flip-flop whose clock pulse input terminal is connected to the output terminal of said third AND gate circuit, and whose resetting terminal is connected to said latch unit for supplying a resetting signal from the output Q when said first and second counting signals are both "0" and said enabling signal is "1", a sixth inverter whose input terminal is connected to said output terminal Q of said flip-flop for inverting said resetting signal; a NAND gate circuit whose two input terminals are connected to the output terminal of said fourth inverter and said latch unit for obtaining a NAND of signals supplied therefrom to supply a signal; and a second flip-flop whose resetting terminal is connected to the output terminal of said NAND circuit, whose setting terminal is connected to the output terminal of said sixth inverter, whose clock pulse input terminal is connected to the output terminal of said fifth inverter, and whose output Q is connected to said scanning counter for supplying an enabling signal to said scanning counter from said output terminal Q.

* * * * *